March 29, 1949.   E. E. MOTT   2,465,468

TESTING SYSTEM AND METHOD

Filed March 14, 1945

INVENTOR
E. E. MOTT
BY
Walter M. Hill
ATTORNEY

Patented Mar. 29, 1949

2,465,468

UNITED STATES PATENT OFFICE 2,465,468

TESTING SYSTEM AND METHOD

Edward E. Mott, Upper Montclair, N. J., assignor to Bell Telephone Laboratories, Incorporated, New York, N. Y., a corporation of New York Application March 14, 1945, Serial No. 582,776

1 Claim. (Cl. 179—175.1)

This invention relates to the testing of electroacoustic transducers and more particularly to that type of electroacoustic transducer known as a throat microphone. By throat microphone is meant an electroacoustic device which may be supported on the outside of the throat adjacent to the larynx so that acoustic energy existing inside the oral cavity is transmitted in part through the wall of the larynx to operate the microphone.

The general method of testing any electroacoustic transducer of the microphone type is to apply acoustic energy of a known magnitude to the device and to measure the output of the transducer. This necessarily implies some type of acoustic coupling between the sound source and the transducer under test. The impedance of this coupling link is of particular importance as the response of the transducer may be considerably modified by the character of this link. It is of particular advantage to have the impedance of this link as nearly identical to that existing under the conditions of use as possible. Most devices and methods heretofore tried for the response measurement of the throat microphone have been quite unsatisfactory and the results have been considered rather unreliable for various reasons. The principal difficulty has been thought due to the improper character of the impedance of the link coupling the sound source to the microphone under test.

It is the object of this invention to provide a means for testing throat microphones which is capable of producing reliable results consistent with the performance of the microphones under actual working conditions.

The foregoing object is attained by this invention by providing a means for measuring the response of a throat microphone to acoustic energy introduced into the human throat comprising introducing this acoustic energy into the oral cavity of a human head at a predetermined intensity, subjecting the microphone to the energy transmitted through the wall of the laryngeal cavity and measuring the response of the microphone to this energy.

Figure 1:
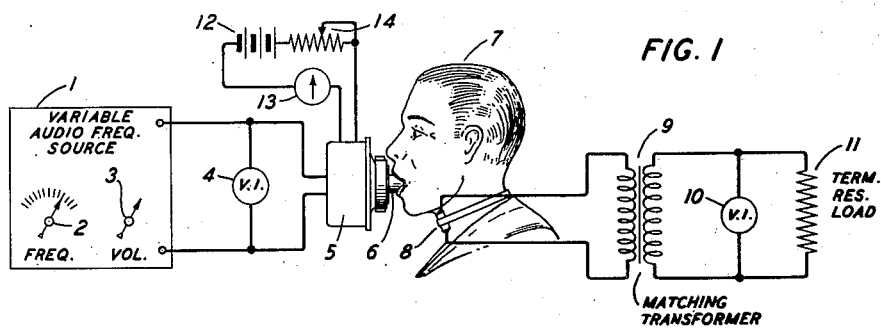
Figure 2:
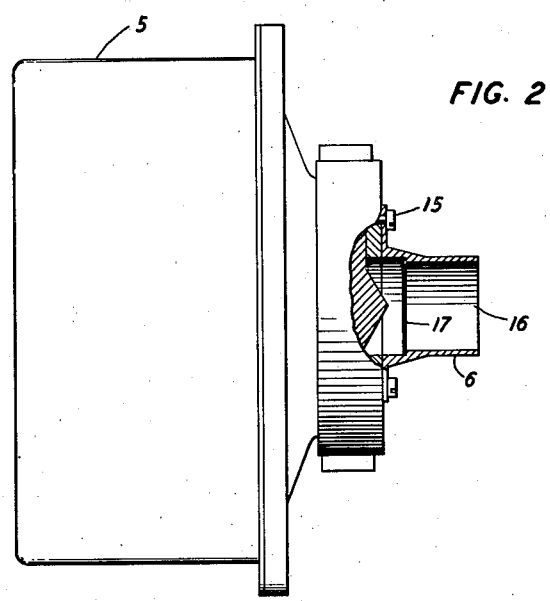
Figure 3:
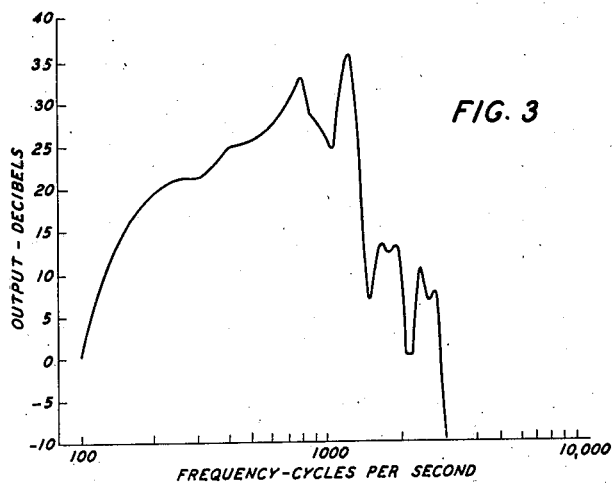

This invention may be better understood by referring to the accompanying drawings in which:

Fig. 1 discloses in schematic form an embodiment of the invention and the method of making the test;

Fig. 2 discloses in greater detail the mouthpiece of the sound source for introducing the acoustic energy into the human head; and Fig. 3 is illustrative of a response characteristic which may be obtained from a microphone tested in accordance with the teachings of this invention.

Referring now more particularly to Fig. 1 wherein is disclosed a variable source of audio frequency electric energy 1 the frequency whereof may be controlled by a control dial 2 and the volume of which may be varied by means of a volume control dial 3. The magnitude of this volume may be indicated by a volume indicator of conventional form 4. Audio frequency source 1 is shown in block form but it may be any of the well-known oscillators, preferably that type known as the beat frequency or heterodyne oscillator. The output of this oscillator is applied to an electroacoustic transducer 5 of conventional design. While transducer 5 may be any of the conventional forms well known in the art, it is preferably of the electrodynamic type wherein the acoustic energy is transmitted through a tubular output orifice as, for example, the electrodynamic device disclosed in United States Patent 1,707,544, issued April 2, 1929, to A. L. Thuras. This electrodynamic device is modified only to the extent that a special mouthpiece 6, more particularly hereinafter described in connection with Fig. 2 is attached to the electrodynamic device.

Mouthpiece 6 is adapted to be introduced into the oral cavity of a human head 7 by way of the mouth as shown in Fig. 1. Acoustic energy of audio frequency generated by the transducer 5 is thereby introduced into the oral cavity of the head and consequently this energy will be transmitted to the laryngeal cavity and a portion thereof through the throat wall at the larynx. A throat microphone 8 under test is applied to the outside of the throat in its conventional location and as is well known this microphone is held against the larynx so as to receive the acoustic energy transmitted through this wall. The response of the microphone 8 is measured by a volume indicator 10 to which it is coupled through a matching transformer 9. In order that the output circuit of the microphone 8 will be properly matched to the impedance of the microphone a terminating resistance load 11 is connected to the secondary circuit of transformer 9.

Electroacoustic transducer 5 may be of the permanent field type although for this purpose it is preferably of the electromagnetic field type wherein the field is obtained from a direct current source 12 through an ammeter 13 and a control rheostat 14. In this way standard conditions of measurement may be more easily assured and greater flexibility may also be secured.

In Fig. 2 it will be noted that the electroacoustic device 5 is shown partly cut away and reference to the above-cited patent to A. L. Thuras will disclose all of the remaining important details of the transducer itself. In Fig. 2 it will be noted that the mouthpiece 6 is attached by any convenient means, for example, screws 15, to the output orifice of the transducer 5. It is preferable that the length of this mouthpiece be as short as possible consistent with ease of use. A suitable length for the mouthpiece 6 has been found to be in the order ¾ inch to 1 inch long. It has also been found desirable to have this mouthpiece as large in diameter as can be accommodated, in order to reduce as much as possible the impedance between the sound source and the laryngeal cavity of the human head 7. A suitable diameter for the opening 16 of the mouthpiece 6 has been found to be in the order of 1½ inches. In general, the ratio of diameter to length should not be materially less than unity.

In order to prevent moisture entering the transducer 5 from the oral cavity, a moistureproof membrane 17 is mounted inside the opening 16 of the mouthpiece 6. This may be of rubberized silk about 3 mills in thickness or of any other similar material providing, however, that it does not introduce an appreciable impedance to the acoustic link. This membrane may be secured to a shoulder inside the mouthpiece 6 by any suitable means as, for example, a clamping ring or by means of a waterproof cement.

In using the apparatus of this invention the field of transducer 5 is energized from source 12 to a predetermined field intensity as indicated by meter 13, the adjustments being made by adjusting rheostat 14. The mouthpiece 6 is then introduced into the mouth of a human head 7. The microphone 8 under test is applied to the throat in the conventional manner and is connected to the matching transformer 9 as previously described. The frequency control 2 in the variable audio frequency source 1 is then adjusted to a series of frequency steps throughout the audio frequency range of interest as, for example, from 30 cycles per second to 5,000 cycles per second. At each frequency setting determined by frequency control dial 2 the volume control dial 3 is adjusted if necessary in order to maintain the output level at a predetermined value as indicated by the volume indicator 4. It will thus be seen that the electroacoustic transducer 5 becomes a sound source of variable audio frequency and that this source is coupled to the oral cavity of the human head by reason of the coupling means 6. This introduces acoustic energy of the desired range of frequencies into the oral cavity of the human head which is transmitted through the throat wall to the microphone 8 under test. The response of the microphone is obtained from the readings of the volume indicator 10 for each of the frequencies to which the variable audio frequency source 1 is adjusted. This data may be plotted into the form of a curve as, for example, that shown in Fig. 3, which is plotted from actual data obtained from the test of one well-known kind of throat microphone exemplified by the disclosure of United States Patent 2,202,906 issued June 4, 1940, to M. S. Hawley. It is obvious, of course, that any other kind of throat microphone may be tested by this apparatus and method.

From the foregoing description it is obvious that not only has apparatus been disclosed but a novel method of testing this type of transducer has also been disclosed. This method may be described in its most simple terms as introducing acoustic energy of predetermined or known intensity into the oral cavity of the human head, subjecting the microphone to the energy transmitted through the wall of the laryngeal cavity and measuring the response of the microphone.

What is claimed is:

An apparatus for measuring the response of a throat microphone which microphone is adapted for receiving acoustic energy from the outside wall of the laryngeal cavity and converting it into electric energy, comprising a source of acoustic energy of predetermined intensity, acoustic coupling means for coupling said source to the oral cavity, said means comprising a substantially cylindrical tube attached at one end to said source and the other end thereof is adapted for insertion into the oral cavity and wherein the tube has a ratio of inside diameter to length of not less than unity so that its acoustic impedance is negligible, means for supporting the microphone to be tested on the outside wall of the laryngeal cavity whereby the microphone is subjected to the acoustic energy originating from said source and transmitted through said wall, and means for measuring the electric output of said microphone.

EDWARD E. MOTT.

REFERENCES CITED

The following references are of record in the file of this patent:

UNITED STATES PATENTS

| Number | Name | Date |
| --- | --- | --- |
| 1,426,807 | Arnold et al. | Aug. 22, 1922 |
| 1,536,763 | Brown | May 5, 1925 |
| 2,111,135 | Bagno | Mar. 15, 1938 |
| 2,184,511 | Bagno | Dec. 26, 1939 |
| 2,374,090 | French | Apr. 17, 1945 |